(12) United States Patent
Reiss et al.

(10) Patent No.: US 9,809,239 B1
(45) Date of Patent: Nov. 7, 2017

(54) TROLLEY FOR COLLECTING WASTE

(71) Applicant: Airbus Operations GmbH, Hamburg (DE)

(72) Inventors: Matthias Reiss, Hamburg (DE); Nicolas Jourdan, Hamburg (DE); Ralf Schliwa, Hamburg (DE); Donald De Gutz, Hamburg (DE); Gabriel Ribeiro Reis, Sao Paulo-SP (BR); Denise Renata Passos Ikuno, Sao Paulo (BR); Liana Maki Shintate, Sao Paulo-SP (BR); Tadeu Kendy de Oliveira Omae, Sao Paulo (BR); Lucas Marques Otsuka, Santo Andre (BR); Lucas Neumann De Antonio, Sao Paulo-SP (BR)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 15/281,132

(22) Filed: Sep. 30, 2016

(51) Int. Cl.
*B62B 3/08* (2006.01)
*B62B 3/00* (2006.01)
*B62B 5/06* (2006.01)

(52) U.S. Cl.
CPC ............... *B62B 3/004* (2013.01); *B62B 5/06* (2013.01)

(58) Field of Classification Search
CPC . B62B 3/004; B62B 3/005; B62B 3/08; B65F 1/1473; B65F 1/1607; B65F 1/1623; B65F 1/1646; B65F 1/16

(Continued)

(56) References Cited

U.S. PATENT DOCUMENTS 2,644,737 A * 7/1953 Davis ................. B65F 1/08
220/263
4,670,227 A * 6/1987 Smith .................. A61L 11/00
280/33.998

(Continued)

FOREIGN PATENT DOCUMENTS

EP 2949459 A1 12/2015

OTHER PUBLICATIONS

Quintanilha, Leandro, Team Retrolley, Published May 18, 2015, Retrieved via YouTube Jan. 12, 2017. (https://www.youtube.com/watch?v=75sVDajZaW4).

(Continued)

*Primary Examiner* — Jeffrey J Restifo
(74) *Attorney, Agent, or Firm* — Lorenz & Kopf, LLP (57) ABSTRACT

A trolley for collecting waste includes: wheels, a steering handle, and a housing with a bottomwall and a sidewall extending vertically from the bottomwall, wherein the housing forms a waste chamber, wherein the sidewall comprises an opening, wherein a flap is connected by a first bearing to the sidewall of the housing, such that the flap is pivotable about a horizontal flap axis between a closing position and an opening position. The flap in its closing position closes the opening of the sidewall, and the flap in its opening position opens the opening in the sidewall, wherein the handle is connected by a second bearing to the housing, such that the handle is pivotable about a handle axis between a first handle position and a second handle position, and the handle is linked to the flap by a mechanical linkage, such that pivoting the handle from its second handle position to its first handle position results in a pivoting of the flap from its opening position to its closing position.

15 Claims, 4 Drawing Sheets

(58) Field of Classification Search
USPC .................. 280/47.34, 47.35, 79.11, 79.2
See application file for complete search history.

(56) References Cited

U.S. PATENT DOCUMENTS

| | | | | |
|---|---|---|---|---|
| 5,230,525 | A * | 7/1993 | Delmerico | B65F 1/1468 220/263 |
| 5,326,117 | A * | 7/1994 | Cook | A61G 12/001 248/129 |
| 6,000,569 | A * | 12/1999 | Liu | B65F 1/1426 220/263 |
| 6,202,922 | B1 * | 3/2001 | Phillips | B65F 1/062 220/908 |
| 6,209,744 | B1 * | 4/2001 | Gill | B65F 1/163 220/263 |
| 6,390,495 | B1 * | 5/2002 | Cates | B62B 1/10 280/47.26 |
| 6,827,357 | B2 * | 12/2004 | Calmeise | A47L 13/51 280/47.34 |
| 8,001,887 | B2 * | 8/2011 | Harari | B30B 9/3053 100/229 A |
| 8,662,345 | B1 * | 3/2014 | Wang | B65F 1/16 220/23.86 |
| 8,690,170 | B2 * | 4/2014 | Belanger | B29C 70/86 280/47.34 |
| 8,696,028 | B2 * | 4/2014 | Nelson | A47L 13/50 280/47.34 |
| 8,840,122 | B1 * | 9/2014 | Cummins | B62B 3/005 280/47.35 |
| 9,113,706 | B1 * | 8/2015 | Cannon | A47B 87/007 |
| D776,893 | S * | 1/2017 | Stauss | B62B 3/005 D34/5 |
| 2006/0261143 | A1 * | 11/2006 | Sola Barbarin | B65F 1/06 232/43.1 |
| 2008/0185804 | A1 * | 8/2008 | Li | B65F 1/10 280/79.2 |
| 2008/0272119 | A1 * | 11/2008 | Efstathiou | B65F 1/1473 220/264 |
| 2011/0248458 | A1 * | 10/2011 | Belanger | B29C 65/483 280/47.35 |
| 2013/0075400 | A1 * | 3/2013 | Robinson | B65F 1/141 220/263 |
| 2013/0113171 | A1 * | 5/2013 | Pennings | B62B 3/104 280/47.34 |
| 2014/0021690 | A1 * | 1/2014 | Burd | B62B 3/003 280/47.35 |
| 2014/0209605 | A1 * | 7/2014 | Spahmann | B65F 1/163 220/264 |
| 2015/0108888 | A1 * | 4/2015 | Galimberti | B65F 1/0073 312/270.3 |
| 2016/0015455 | A1 * | 1/2016 | Wu | A61B 50/13 280/79.3 |
| 2016/0229628 | A1 * | 8/2016 | Chakravarthy | B65F 1/062 |
| 2017/0137048 | A1 * | 5/2017 | Childress | B62B 3/005 |

OTHER PUBLICATIONS

Ikuno, Denise; Maki, Liana; Neumannn, Lucas;Otsuka, Lucas; Omae, Tadeu; Airbus FYI Report 2015, Retrolley, pp. 1-27.
Neumann, Lucas, Retrolley (Industrial), pp. 1-9. (http://lucasn.com/trolley/html).

* cited by examiner

TROLLEY FOR COLLECTING WASTE

TECHNICAL FIELD

An exemplary embodiment of the present invention relates to a trolley for collecting waste.

BACKGROUND

In large passenger vehicles, in particular in aircrafts for long haul flights, passenger capacities tend to be ever increasing, while at the same time the efficiency of the available space inside the cabin is more and more improved. For example, cabin monuments, such as galleys and lavatories, are increasingly space efficient and allow the integration of an optimized amount of passenger seats. Besides storing food and other items it is mandatory to provide sufficient space for collecting waste.

Waste may arise from meal packages and other used items from the passengers. Simply collecting waste would lead to a plurality of bulky plastic bags, which need to be stored safely. To improve the waste collection and storage, it is known to use waste compaction systems, which may compact bulky plastic bags containing meal packages, etc. into compact and easily storable waste packages.

The most common approach for waste compaction systems in civil aircraft is based on electromechanical waste compactors, which are rather powerful but comprise a high weight due to the mechanical components such as an electrical motor, gears, supports and bearings. As a result, a large part of the available space in a half size or full size trolley may be allocated for the electromechanical waste compactor, such that only a reduced amount of waste is collectable with this trolley. Further, due to the weight of the electromechanical compactor, the electromechanical compactor is usually a fixed part of the galley and cannot be moved through the cabin. The available space for storing waste and/or other goods in the galley is therefore reduced, while the reliability of electromechanical waste compactors may be low and/or insufficient.

It is further known to use vacuum-based waste compactors, which comprise vacuum connector at the trolley unit that comprise a sleeve or hull surrounding a waste bag, which sleeve or hull is evacuated and thereby presses the waste bag to a compact package via applying a vacuum. However, compacting the waste in the trolley via a vacuum requires a vacuum source to which the connector of the trolley is to be connected, if the compaction of waste is to be carried out. Thus, for compacting the waste, the trolley has to be connected to the vacuum source. In particular, an intermediate compaction of waste collected by the trolley may not be practical, as the vacuum source may just be available at the galley. Patent document EP2949459A1 illustrates such a trolley.

BRIEF SUMMARY

For the ease of use and increased waste collection capacity it may be desirable to provide a trolley for collecting waste with an enlarged capacity and at the same time a low weight. Consequently, an alternative trolley for collecting waste with large waste collection capacity and low weight is provided by the exemplary embodiments described herein.

Certain advantages are provided by a trolley according to claim 1. Advantageous embodiments and further improvements may be gathered from the sub-claims and the following description.

A trolley for collecting waste is proposed comprising wheels for moving the trolley, a handle for steering the trolley, and a housing with a bottomwall and a sidewall extending from the bottomwall in vertical direction. The housing forms a waste chamber for receiving waste. Further, the sidewall comprises an opening. A flap is connected by a first bearing to the housing, in particular to its sidewall, such that the flap is pivotable about a horizontal flap axis formed and/or determined by the first bearing at least between a closing position and an opening position. If the flap is in its closing position, the flap closes the opening of the sidewall. If the flap is in its opening position, the flap opens the opening of the sidewall, such that waste can be inserted into the waste chamber. The handle is connected by a second bearing to the housing, such that the handle is pivotable about a handle axis formed and/or determined by the second bearing at least between a first handle position and a second handle position. The handle is linked to the flap by a mechanical linkage, such that pivoting the handle from its second handle position to its first handle position results in a pivoting of the flap from its opening position to its closing position.

The trolley is preferably a movable trolley. For this purpose, the trolley comprises the wheels, such that the trolley can be driven and/or moved. The wheels are preferably attached to the bottomwall of housing of the trolley, while keeping its characteristic to be pivotable about a corresponding wheel axis. The movable trolley may be a modified full size trolley or a modified half size trolley. In particular, the trolley may be an aircraft trolley. The trolley may also refer to as a movable cart. The wheels, or at least one of the wheels, may be lockable. In practice, the trolley may be used for collecting waste within an aircraft.

The housing of the trolley comprises a bottomwall and a sidewall. The sidewall extends from the bottomwall in vertical direction. The sidewall may be a single piece sidewall. However, preferably, the sidewall may be a multi-piece sidewall comprising several sidewall sections, each or at least some of them extending from the bottomwall in vertical direction. The bottomwall and the sidewall, and thus the housing, forms a waste chamber for receiving waste. The bottomwall and the sidewall of the housing are preferably air-tight and/or fluid-tight. Consequently, the bottomwall and the sidewall of the housing are configured to prevent a leakage of gas, air, liquid and/or fluid. Thus, waste inserted into the waste chamber can be collected in the waste chamber.

Further, the housing may comprise a cover wall. The cover wall is preferably arranged opposite to the bottomwall. Thus, the sidewalls preferably extend from the bottomwall in vertical direction to the cover wall. The cover wall may be formed by a cap. The cap may be connected to the sidewall by a third bearing, such that the cap is pivotable about a horizontal cap axis. If the cover wall, in particular the pivotable cap, is opened, the top surface of the housing provides a top-opening. This opening is not meant as the opening in/at the sidewall of the housing.

The waste chamber formed by the bottomwall and the sidewall of the housing has a chamber volume. The chamber volume is also referred to as the regular chamber volume or regular volume. As the chamber volume of the waste chamber may limit the quantity of waste to be inserted into the waste chamber and/or collected, it is proposed to provide an opening in the sidewall, when a flap is connected by the first bearing to the housing, such that the flap is pivotable about a horizontal axis between the closing position and the opening position. If the flap is in its closing position, the flap closes the opening of the sidewall. Thus, the waste chamber may be formed by the housing, wherein the housing comprises the bottomwall and the sidewall and further, preferably, the flap. Thus, by closing the flap and thus by closing the opening of the sidewall, the waste chamber has the chamber volume. In order to extend the volume of the waste chamber, the flap may be pivoted to its opening position, such that the opening and the sidewall is opened. If the flap is in the opening position, it is arranged in an angle between 15° and 60°, preferably between 20° and 45°, with respect to a vertical axis of the housing. Consequently, waste can be inserted into the waste chamber through a wedged shape area between the flap and the opening in the sidewall. The area between the flap and the opening in the sidewall may also be referred to as the additional waste chamber. The additional waste chamber and the waste chamber may form together an extended waste chamber. The extended waste chamber therefore has a larger volume than the chamber volume of the waste chamber. The volume of the extended waste chamber is the extended waste chamber volume. As a result, for collecting waste by using the trolley, waste can be inserted into the waste chamber as such as well as into the additional waste chamber. Consequently, a higher quantity of waste can be collected by the trolley. Usually, waste may comprise caps, packaging, small cartons, and/or other waste, which may be collected within a cabin of an aircraft. Consequently, such waste may be compacted in order to reduce its volume and/or in order to increase its density.

Preferably, the first bearing is arranged at a bottom edge of the opening of the sidewall. Consequently, waste inserted into the additional waste chamber is subjected to gravity and therefore the flap prevents a dropping out of waste inserted into the additional waste chamber. Furthermore, the flap is pivotable about a horizontal flap axis defined by the first bearing, such that the flap can be pivoted from the opening position to the closing position. Performing this position change of the flap results in a compaction of waste in the waste chamber and/or the additional waste chamber. In other words, waste inserted into the extended waste chamber is compacted, such that the same waste is just and/or only arranged in the waste chamber. Thus, when pivoting the flap from the opening position to the closing position, the waste arranged in the additional waste chamber is pressed into the waste chamber resulting in a compaction of the whole waste. As an effect, the trolley may incorporate more waste, while the trolley comprises a reduced and/or standard external dimension, if the flap is in its closing position.

The handle of the trolley provides a double function. A first function of the handle is its capability for being used for steering the trolley. Thus, the handle may have the function of a grasp. A further function of the handle may result from its connection to the housing by the second bearing, such that the handle is pivotable about a handle axis provided by the second bearing. Thus, the handle is pivotable about the handle axis between a first handle position and a second handle position. Preferably, the handle is in the first handle position, if the handle, at least basically, has a horizontal orientation and/or is in alignment and/or parallel with the cover wall of the housing. Pivoting the handle upwards preferably results in reaching the second handle position. Thus, the handle may be in the second position, if the handle at least basically is arranged in an angle between 0° and 70° with respect to the vertical axis of the trolley. Preferably, the handle is in the second position, if the handle is at least basically moved above the housing of the trolley.

Furthermore, the handle is linked to the flap by a mechanical linkage. Preferably, the mechanical linkage is an assembly of elements connected by joints. Thus, the elements of the mechanical linkage may be pivotably linked together. The mechanical linkage is preferably configured to transfer a pivot movement. Further preferred, the mechanical linkage is configured, such that a pivoting of the handle is transformed to a pivoting of the flap. Thus, the mechanical linkage is preferably configured, such that a pivoting of the handle from its second handle position to its first handle position results in a pivoting of the flap from its opening position to its closing position. As an effect, a single pivoting movement of the handle from its second handle position to its first handle position is sufficient in order to pivot the flap from its opening position to its closing position. Thus, when waste is inserted into the waste chamber and the additional waste chamber, the handle can be pivoted from its second handle position to its first handle position, such that the flap is pivoted from its opening position to its closing position and at the same time compacting the waste inserted into the extended waste chamber is performed, such that the waste is compacted arranged just in the waste chamber. In other words, the extended chamber volume is reduced to the chamber volume resulting in the corresponding compacting effect.

As a further result, pivoting the handle from its second position to its first position is sufficient in order to reach the compaction of the waste, while the external dimensions of the trolley are reduced at the same time, preferably to dimensions of a full or half size trolley, such that the trolley may be parked in a respective park position, preferably within a galley of an aircraft.

Further, the handle, which may be used for compacting the waste may also be used for steering the trolley. Therefore, the handle may be used for steering the trolley by a cabin attendant to walk through the cabin and in order to collect waste. If the waste collection is finished, the cabin attendant may pivot the handle from its second handle position to its first handle position in order to compact the waste. Thereafter, the trolley has reduced external dimensions. The trolley, now having the reduced external dimensions, may be driven or steered through the cabin towards the galley in order to be parked. In the galley, the waste collected in the waste trolley may be disposed.

Preferably, a replaceable waste bag is arranged in the housing of the trolley, such that the waste bag basically encompasses the waste chamber. Further, the waste bag may be configured, such that the waste bag encompasses the extended waste chamber, if the flap is in its opening position. The opening of the waste bag is arranged towards the top, such that waste can be inserted through the wedged shaped area formed by the flap and the opening in the sidewall of the housing of the trolley. Further, in case the housing comprises a pivotable cap, waste can also be inserted from the top side of the trolley into the waste bag. The waste bag is preferably a deformable waste bag. In particular, the waste bag may be a plastic waste bag. After collecting waste, the handle may be pivoted from its second handle position to its first handle position, such that the flap is pivoted from its opening position to its closing position. This results in the compaction of the waste, wherein the waste bag is deformed accordingly. For disposing the waste within the waste bag, the waste bag may be withdrawn out of the housing. Preferably, the waste bag may be configured as a closable waste bag. Thus, before withdrawing the waste bag out of the housing, the waste bag may be closed. Consequently, an expansion of the waste after withdrawing the waste bag out of the housing may be prevented, at least partly. The waste bag may be placed, for example in the galley, at a desired place.

According to an exemplary embodiment of the trolley, the handle is linked to the flap by the mechanical linkage, such that pivoting the handle from its first handle position to its second handle position, preferably also, results in a pivoting of the flap from its closing position to its opening position. As a result, the handle may be used for pivoting the flap from its closing position to its opening position, and vice versa. Thus, in order to collect waste, the cabin attendant may pivot the handle from its first handle position to its second handle position, such that the flap is pivoted from its closing position to its opening position. As an effect, the extended waste chamber comprising the extended volume is provided for inserting waste. The cabin attendant may therefore walk through the cabin of an aircraft in order to collect waste and insert this waste into the extended waste chamber, wherein waste enters the waste chamber as such as well as the additional waste chamber. After finishing the collection of waste, the cabin attendant may pivot the handle from its second handle position to its first handle position in order to pivot the flap from its opening position to its closing position, which results in the previously explained compaction of waste. As an effect, the outer dimensions of the housing of the trolley can be extended for collecting waste, while after finishing the collection of waste, the outer dimensions of the trolley can be reduced by pivoting the flap to its closing position in order to park the trolley, now containing the compacted, collected waste, in a desired place.

According to a further embodiment of the trolley, a lower section of the flap is connected by the first bearing to a section of the sidewall extending between the opening and the bottomwall. Accordingly, the flap may be connected by the first bearing to a bottom edge of the opening or the section following the bottom edge of the opening extending between the opening and the sidewall. As a result, the flap may extend from the first bearing or the bottom edge of the opening in the sidewall to a top edge of the opening in the sidewall, or even above. The previously explained extension of the flap preferably relates to the flap, if the flap is in the closing position. If the flap is in its opening position, the flap extends in an oblique angle to the sidewall of the housing, where the opening of the sidewall is provided as opened.

According to an exemplary embodiment of the trolley, the handle is configured as a length adjustable handle. Extending the length of the handle may be favourable if the handle is to be pivoted from its second handle position to its first handle position, as the mechanical linkage linking the handle and the flap provides a respective pivoting of the flap from its opening position to its closing position. Thus, extending the length of the handle would result in less force to be applied by a person, for example the cabin attendant, in order to pivot the handle from its second position to its first position. In other words, higher forces may be applied to the flap when pivoting the handle from the second handle position to the first handle position in order to pivot the flap from its opening position to its closing position. As a further result, waste inserted into the extended waste chamber may be subject to higher forces and thus a higher compaction of the waste may surely be provided without any need of a further motorized support. Instead, the waste compaction may be performed by physical muscle strength of the person pivoting the handle. As an effect, the larger part of the trolley may be used for the waste chamber and/or other purposes.

In other words, the mechanical linkage may be of a compact size, resulting in a small installation space needed at the trolley.

According to an exemplary embodiment of the trolley, the handle comprises a telescopically length adjustable handle section extending between the handle axis and a grip section of the handle. The grip section of the handle preferably serves as the section of the handle, where a person may grip the handle in order to pivot the handle between the first handle position and the second handle position, or vice versa. In other words, the grip section of the handle may be formed by a section, in particular end section, of the handle being opposite to the handle axis and/or first bearing. The adjustable handle section preferably extends between the handle axis and the grip section of the handle. This adjustable handle section is adjustable in its length, namely telescopically. Thus, this length adjustable handle section may comprise two or more segments intertwine with each other. At least two of the segments may form a linear guide, such that these segments may slide relative to each other. As a result, the length adjustable handle section may be telescopically extended in its length or telescopically reduced in its length. As an effect, the length adjustable handle section may be extended in its length telescopically, if the handle is to be pivoted from its second handle position to its first handle position, or vice versa. As a further result, the length adjustable handle section may be telescopically reduced in its length if the handle is supposed to be stay, at least temporarily, in its second handle position or in its first handle position. If the handle is in its first handle position, the handle is preferably in alignment with the top surface of the housing. Thus, having a reduced length, the handle may not result in an extended external dimension of the housing and/or trolley. Instead, the length adjustable handle section may be configured, such that the handle would not project above the housing of the trolley, if the handle is in its first handle position and if the length adjustable handle section is telescopically reduced. As an effect, the trolley may comprise external dimensions of a full size trolley or half size trolley. Further, if the length adjustable handle section of the handle is telescopically reduced if the handle is in its second handle position, a disturbance of the handle is reduced with respect to the collection of waste.

According to a further embodiment of the trolley, the handle, in particular its grip section, comprises an operation button. The handle is preferably configured, such that the length of the handle, in particular of its length adjustable handle section, is adjustable, if the operation button is operated, in particular pushed. Further preferably, the handle is configured, such that the length of the handle, in particular of its length adjustable handle section, is locked, if the operating button is not operated, in particular not pushed. As an effect, the operating button may be operated in order to adjust the length of the handle, in particular of its length adjustable handle section. If the operating button is not operated, the length of the handle, in particular of its length adjustable handle section, is locked, such that the length of the handle or its length adjustable handle section remains in its current state and/or length. As an effect, the operating button may be operated, if the handle is for example in its second handle position, in order to extend the length of the handle and/or its length adjustable handle section. Thereafter, the handle may be pivoted, such that the handle is moved to its first handle position resulting in the position change of the flap from its opening position to its closing position. Thereafter, the operating button may be operated again, in order to reduce the length of the handle, in particular of its length adjustable handle section, such that the handle preferably does not project above the housing of the trolley. As a further effect, if the length of the handle or its length adjustable handle section is extended and if the operating button is not operated, the person handling the handle may lean on the extended length of the handle, such that the operation of the handle is secure.

According to a further embodiment of the trolley, the handle, the mechanical linkage and/or the housing comprises a locking unit configured to lock the handle in its first handle position and/or in its second handle position. For example, if the handle is locked in its first handle position, a respective locking may result for the flap, as the flap is linked to the handle by the mechanical linkage. Thus, locking the handle in its first handle position may result in a locking of the flap in its closing position. As an effect, an unintended pivot movement of the flap may be prevented, in particular from the closing position of the flap to the opening position of the flap. This locking is favourable, if a compaction of waste has been performed previously by pivoting the handle from its second handle position to its first handle position resulting in a compaction of waste by pivoting the flap from its opening position to its closing position. As a further effect, locking the handle in its first position resulting preferably in a locking of the flap in its closing position allows to securely move the trolley within the cabin and/or to securely park the trolley in a desired place. In a further example, the handle may be locked by the locking unit in its second handle position. As the handle is linked by the mechanical linkage to the flap, locking the handle in its second handle position may result in a locking of the flap in its opening position. As an effect, collection of waste and therefore inserting the waste into the extended waste chamber may be securely performed, without a fear that the flap may unintendedly pivot from the opening position to the closing position.

Preferably, the locking unit comprises an operating button to operate the locking unit. Preferably, the operation button is arranged at a lateral surface of the first bearing and/or housing. In particular, the locking unit is configured by the operating button to unlock or to lock the handle. In particular, the locking unit may be operated by the operating button to unlock the handle if the handle is locked in its first handle position and/or in its second handle position. Further and/or alternatively, the locking unit may be operated by the operating button to lock the handle, preferably in its first handle position and/or its second handle position. In particular, when the locking unit locks the handle, the locking unit is in a locking state. To transfer the locking unit into an unlocked state, where the handle may be moved freely, the further operating button may be respectively operated in order to transfer the locking unit into said unlocked state. Further preferably, the locking unit may be configured to automatically transfer to its locking state, if the handle is pivoted into its first handle position and/or its second handle position.

According to a further embodiment of the trolley and/or the housing comprises a flap locking unit configured to lock the flap in its first opening position and/or in its closing position. In this regard, reference is made in an analogous manner to the previously explained examples, effects and/or advantages with respect to the locking unit for the handle, which are preferably hold in analogous manner for the flap locking unit, the flap, the opening state and/or the closing state.

According to a further embodiment of the trolley, the mechanical linkage comprises a clutch, which may be switched between a coupling state and a decoupling state. The mechanical linkage couples the handle and the flap, if the clutch is in the coupling state. The mechanical linkage decouples the handle and the flap, if the clutch is in the decoupling state, such that the handle is pivotable without resulting in a pivot movement of the flap, and/or vice versa. As a result, the mechanical linkage comprising the clutch may be a specified embodiment of the mechanical linkage. The clutch preferably refers to a mechanical device that engages power transmission, and in particular a pivoting movement of the handle, or disengages the power transmission, in particular the pivoting movement of the handle. Preferably, if the clutch is in the coupling state, the clutch engages the further elements of the mechanical linkage, such that the handle and the flap are linked, such that pivoting the handle will result in a pivoting of the flap. Further preferably, if the clutch is in the decoupling state, the clutch disengages the further elements of the mechanical linkage, such that the handle and the flap are decoupled. Decoupling should be preferably understood in this context, such that the mechanical linkage does not transfer a pivoting movement of the handle to the flap, and/or vice versa. In other words, decoupling may be understood in this context, such that the mechanical linkage would not link the handle and the flap, such that the handle may be pivoted from the second handle position to the first handle position, or vice versa, without resulting a pivoting of the flap.

Preferably, the clutch comprises a clutch operation button. The clutch is preferably configured, such that the clutch may be operated by the clutch operation button. Thus, the clutch may be configured that operating the clutch operation button will result in a switching between the coupling state and the decoupling state, and/or vice versa. Thus, the clutch may be switched from the coupling state into the decoupling state, and/or vice versa, by operating the clutch operation button.

According to an exemplary embodiment, the clutch operation button is operated in order to switch the clutch of the mechanical linkage into the decoupling state, in particular, if the handle is its first handle position. Thus, the flap may be manually pivoted form its closing position to its opening position. Thereafter, collecting of waste may be performed. Further, the handle may be pivoted from its first handle position to its second handle position. If the handle is in its second handle position and if the flap is in its opening position, the clutch operation button may be operated in order to switch the clutch of the mechanical linkage into the coupling state. Pivoting the handle thereafter from its second handle position to its first handle position will then result in a pivoting of the flap from its opening position to its closing position, resulting in a compaction of waste, which has been previously collected in the extended waste chamber.

According to an even further exemplary embodiment, the clutch operation button is operated in order to switch the clutch of the mechanical linkage into the coupling state. Thereafter, the handle may be pivoted from its first handle position to its second handle position resulting in a pivoting of the flap from its closing state to its opening state. Thereafter, the clutch operation button may be operated again, in order to switch the clutch from the coupling state to the decoupling state. Thereafter, the handle may be freely pivoted from the second handle position to its first handle position. Preferably, the handle in the first handle position would not influence and/or limit the collection of waste, as the handle would not be directed upwardly. Thus, pivoting the handle into its first position would ease the collection of waste. Further, steering the trolley would be eased, if the handle is in its first position. Preferably, the handle is locked via the locking unit in its first position. Thus, waste collection may be performed and steering of the trolley may be enhanced. After the collection of waste is finished, the handle may be unlocked and/or pivoted to its second handle position. Thereafter, the clutch operation button may be operated again, in order to switch the clutch into the coupling state. Pivoting the handle thereafter from its second handle position to its first handle position will then result in a pivoting of the flap from its opening position to its closing position, resulting in a compaction of waste, which has been previously collected in the extended waste chamber.

Preferably, the clutch operation button is arranged at a lateral surface of the first bearing and/or housing. The first bearing is preferably assigned to the mechanical linkage, and in particular to the clutch, in particular partly.

According to a further embodiment, the clutch is configured to automatically switch into the coupling state, if the handle reaches the second handle position, such that the mechanical linkage couples the handle and the flap. Furthermore or alternatively, clutch may preferably configured to automatically switch into the coupling state, if the handle reaches the first handle position, such that the mechanical linkage couples the handle and the flap Preferably, automatically switching the clutch into the coupling state occurs, if the clutch has been previously in the decoupling state. Further preferably, the clutch comprises a snap in locking device, which, in particular automatically, snaps in, if the handle reaches the second handle position. Furthermore or alternatively, the snap in locking device of the clutch may, in particular automatically, snaps in, if the handle reaches the first handle position. Being snapped in, the snap in locking device mechanically connects a handle shaft, defining a handle axis and being connected to the handle, and a first arm device of the mechanical linkage, wherein the first arm device extends from the handle shaft in a releasably form-fit and/or releasably force fit manner. Thus, in order to switch the clutch into the decoupling state, the snap in locking device has to be snapped out. This may be reached by operating the clutch operation button.

As an effect, the clutch operation button may just be operated, in order to switch the clutch from the coupling state into the decoupling state. If the clutch is to be switched from the decoupling state to the coupling state, this may be reached by pivoting the handle to the second handle position. Furthermore or alternatively, if the clutch is to be switched from the decoupling state to the coupling state, this may be reached by pivoting the handle to the first handle position. In practice, after collecting waste, while the handle may be previously freely moved to its first handle position, the handle may be pivoted from the first handle position to the second handle position, which results in the automatic switching of the clutch into its coupling state. Thereafter, the handle may be pivoted from its second handle position to its first handle position, in order to pivot the flap from its opening position to its closing position. As a further effect, the handling of the trolley is simplified.

According to a further embodiment of the trolley, the mechanical linkage does not comprise the above discussed clutch. Thus, the handle may be permanently coupled via the mechanical linkage to the flap. As an effect, the robustness of the mechanical linkage may be increased.

According to a further embodiment of the trolley, the mechanical linkage comprises: a handle shaft as a part of the first bearing and defining the handle axis, a first arm element being, preferably releasably, connected to the handle shaft, a lever being pivotable about a lever axis, and a connecting element. An end section of the first arm element is pivotably connected to a first end section of the lever. A second end section of the lever is pivotably connected to a first end section of the connecting element. A second end section of the connecting element is pivotably connected to the flap, in particular to an upper section of the flap facing away from the first bearing.

Assuming the handle is, in particular at least releasably, connected to the handle shaft, pivoting the handle about the handle axis would result in a pivot movement of the handle shaft. The first arm element is at least releasably connected to the handle shaft. Thus, a pivoting of the handle shaft would result in a swiveling movement of the first arm element. The first end section of the arm element is connected pivotably to a first end section of the lever. Thus, a swiveling movement of the first arm element would result in a pivoting movement of the lever about the lever axis. The second end section of the lever is pivotably connected to the first end section of the connecting element. Thus, a pivoting of the lever would result in an at least partly translational movement of the connecting element. The second end section of the connecting element is pivotally connected to the flap. Thus, the movement of the connecting element would result in a pivoting movement of the flap about the first bearing. Summarizing, a pivoting of the handle would force, by means of the mechanical linkage, a pivoting of the flap.

According to an exemplary embodiment of the trolley, the mechanical linkage is configured to be in a self-locking state for the flap, if the flap is in the closing position and/or if the handle is in the first handle position. As an effect, forces applied to the flap, in particular reaction forces resulting from the compaction of waste, would not result in an unintended pivot movement of the flap. Instead, forces may apply to the flap, if the flap is in the closing position, would not result in a pivoting of the flap from the closing position to the opening position. Thus, the trolley may be handled securely after collecting and compacting waste and thus the trolley may thereafter preferably be stored in a desired parking place.

Preferably, the flap, the connecting element and the lever are unreleasably connected. Further preferably, a first pivot point relates to the pivot bearing between the second end section of the lever and the first end section of the connecting element. Further preferably, a second pivot point relates to the pivot bearing between the second end section of the connecting element and the flap. Further preferably, the first pivot point is arranged on a first side of a virtual axis being defined by the second pivot point and the lever axis. Further preferably, the first pivot point is arranged on a second side of the virtual axis, wherein the second side is opposite to the first side of the virtual axis, if the flap is in its closing position and/or if the handle is in its first handle position. As an effect, if the flap is in the closing position and/or if the handle is in the first handle position, traction applied by the flap to the connecting element would result in a mechanical moment for the handle in a direction from the first handle position towards the second handle position. In other words, said traction applied to the connecting element would not result in a pivot movement of the flap and/or the handle. In particular, the housing may provide a stop for the handle being in the first handle position. Thus, the stop prevents a (further) pivot movement of the handle in a pivot direction from the second handle position to the first handle position. As a further result, traction applied to the connecting element would not result in an at least partly translational movement of the connecting element. Consequently, the flap stays in its closing position, even if the flap is applied by forces resulting from the compaction of waste.

According to a further embodiment of the trolley, the mechanical linkage is configured to be in an unlocked state for the flap, if the handle is pivoted from the first handle position in direction to the second handle position, in particular if the clutch is in the coupling state. By pivoting the handle from its first handle position in the direction to the second handle position, the mechanical linkage is moved too, such that the first pivot point is moved from the second side of the virtual axis to the first side of the virtual axis. If the first pivot point is on the first side of the virtual axis, the mechanical linkage is preferably in the unlocked state. Correspondingly, the mechanical linkage is preferably in the locked state, if the first pivot point is arranged on the second side of the virtual axis. Thus, by pivoting the handle, the mechanical linkage may be driven from the self-locking state for the flap into the unlocked state for the flap. The reverse state change may also be performed by pivoting the handle in a reverse direction.

According to a further embodiment of the trolley, the mechanical linkage is in a stable state for the handle, if the handle is in the first handle position, in particular if the clutch is in the coupling state. Preferably, the handle as well as the flap are subject to gravity. Thus, by pivoting the handle to its first handle position, the handle is preferably horizontally oriented, and in particular aligned with the top surface of the trolley. Further, the handle may be seated on a stop provided by the housing of the trolley. Thus, there may be no forces applied to the handle resulting in an unexpected movement. Referring to the previous explanations, moving the handle into its first handle position may result in a pivoting of the flap into its closing position, wherein the linkage may provide a self-locking state for the flap. Thus, the flay may also not force the handle to move out of its first handle position. Thus, the handle may be in a stable state, if being in its first handle position.

According to an exemplary embodiment of the trolley, the housing comprises a top-opening. Further, the trolley may comprise a cover wall, which is configured to cover the top-opening. The cover wall may be pivotably connected to a top-section of the flap. In particular, a pivot joint—also called as the cover pivot joint—is provided at the top edge of the flap, wherein the cover pivot joint is configured to pivotably connect the cover wall to the flap. If the flap is in its closing position, the cover wall is pivotable, such that the cover wall covers, in particular completely, the top opening of the housing. Further, the cover pivot joint may be configured, such that the cover wall is pivotable to a position, where the cover wall is in an areal or flat contact with an outside surface of the flap. Moreover, the cover wall and/or the flap may be configured, such that the cover wall may be releasably fixed to the outside surface of the flap. For this purpose, the flap and the cover wall may comprise correspondingly configured fixing means, which are configured for a releasably fixing.

According to an exemplary embodiment of the trolley, the housing may comprise a separating wall. The separating wall may be arranged inside of the housing, such that the waste chamber is divided into two waste sub-chambers. Thus, the waste chamber may be formed by the two waste sub-chambers. Preferably, the separating wall extends in a direction perpendicular to the opening in the sidewall. As an effect, waste may be inserted in either of the waste sub-chambers through the opening in the side wall. Further, the top opening of the housing may be configured, such that the top opening provides an opening for both waste sub-chambers. As an effect, waste may be collected depending of this kind in either of the waste sub-chambers. In particular, recyclable waste may be collected in one of the waste sub-chambers, wherein residual waste may be collected in the other waste sub-chamber.

According to an exemplary embodiment of the trolley, a removable container is assigned to housing, such that the waste chamber is formed at least partly by the container. According to the assignment of the container to the housing, the housing still—at least indirectly—forms the waste chamber. The container may comprise a container bottomwall and a container sidewall, wherein the container bottomwall corresponds to the bottomwall of the housing as such. Thus, the container may spread at least essentially about the whole interior space of the housing as such. Further, the container sidewall corresponds to the sidewall of the housing as such with respect to its extension and with respect to the opening. Thus, the container sidewall comprises a container opening, which is oriented opposite to the opening in the sidewall of the housing as such. Accordingly, reference is preferably made to the respective explanations and effects discussed for the sidewall and/or bottomwall for the housing as such.

According to an exemplary embodiment of the trolley, a removable plurality of containers, in particular two containers, are assigned to the housing, such that the waste chamber is formed at least partly by the containers. According to the assignment of the containers to the housing, the housing still—at least indirectly—forms the waste chamber. Further, the waste chamber may be formed by the waste sub-chambers provided by the plurality of the containers. The containers may be designed in a way to stack them for easier handling and storage. Each container may comprise a container bottomwall and a container sidewall. Each container sidewall comprises a container opening, which is oriented opposite to the opening in the sidewall of the housing as such. Thus, waste may be inserted through the opening in the sidewall of the housing and the opening in the container opening, being arranged there behind, in order to throw the waste into the waste sub-chamber provided by the respective container. The plurality of containers may spread at least essentially about the whole interior space of the housing as such. In particular, the containers may comprise the same form. In this case, the containers may be arranged in a parallel arrangement within the housing as such. As a result of the parallel arrangement of the containers, sidewalls of the containers facing each other may form a separating wall within the housing as such. In this regard, reference is preferably made in an analogous manner to the separating wall as discussed above. In particular, a separation of waste may be performed during the collection of waste, wherein different type of waste may be collected in different containers.

Further, each container, namely either the single container or each of the plurality of containers, may comprise a sidewall end section, which attaches to the container bottomwall. The sidewall end section may be configured as circumferentially closed. Thus, the sidewall end section may be water tight or fluid tight. In case of a leakage of water and/or fluid out of a waste bag, this water or fluid may be collected by the container.

According to a further embodiment of the trolley, the housing, the flap and/or each container may comprise at least one fastening means. A fastening means may be a hook or a clamp. Each fastening means is configured to fasten a waste bag. Thus, each fastening means may be arranged, such that it is accessible form the waste chamber. In particular, each container comprises at least one fastening means arranged at an inner surface of the sidewall. Further, at least one fastening means may be arranged at an inner surface of the flap. Thus, a waste bag may be fastened via the at least one fastening means to the flap. As an effect, the waste bag is extended into the pivoting direction of the flap, if the flap is pivoted from its closing position to its opening position. This prevents, that waste may accidentally not be inserted into the waste bag. In case the housing provides a separating wall or if the trolley comprises a plurality of containers, the flap may comprise at least one fastening means for each waste sub-chamber. For each waste sub-chamber, at least one fastening means may be arranged at an area of the inner surface of the flap being arranged opposite to the respective container opening. Thus, a waste bag may be provided for each waste sub-chamber, wherein the waste bags may be fastened to the respective fastening means arranged at the flap. As an effect, even when pivoting the flap from its opening position to its closing position, a jam of the waste bags may be prevented.

According to an exemplary embodiment of the trolley, the flap has an U-shape cross profile. The U-shape cross profile of the flap may provide the effect that waste inserted into the extended waste chamber, in particular into the additional waste chamber, would not unexpectedly fall out laterally of the additional waste chamber. Instead, the U-shape cross profile of the flap may prevent this.

According to a further embodiment of the trolley, the flap comprises a basewall and two standing walls, each extending at least essentially perpendicular from the basewall towards the opening of the housing, wherein the two standing walls are spaced apart from each other. Preferably, the basewall is configured to close the opening of the housing, if the flap is in its closed-state. Further preferably, the standing walls engage through the opening into the waste chamber, if the flap is in its closing state. Further preferably, a funnel or wedge shaped entry area is formed by the flap in its opening state for the opening of the housing, such that waste may be entered through the funnel or wedge shaped entry area into the waste chamber. Further preferably, the funnel and/or wedge shaped entry area is bounded by the flap, in particular by its basewall and its two standing walls. As a result, the two standing walls prevent an unexpected fallout of waste laterally out of the additional waste chamber and/or the extended waste chamber.

Also disclosed herein is a trolley for collecting waste, comprising: wheels for moving the trolley, a handle for steering the trolley, and a housing with a bottomwall and a sidewall extending from the bottomwall in vertical direction V, wherein the housing forms a waste chamber for receiving waste, wherein the sidewall comprises an opening, wherein a flap is connected by a first bearing to the housing, in particular to its sidewall, such that the flap is pivotable about a horizontal flap axis at least between a closing position and an opening position, wherein the flap in its closing position closes the opening of the sidewall, and wherein the flap in its opening position opens the opening in the sidewall, such that waste may be inserted into the waste chamber, wherein the handle is connected by a second bearing to the housing, such that the handle is pivotable about a handle axis at least between a first handle position and a second handle position, and wherein the handle is linked to the flap by a mechanical linkage, such that pivoting the handle from its second handle position to its first handle position results in a pivoting of the flap from its opening position to its closing position.

According to an exemplary embodiment of the trolley, the handle is linked to the flap by the mechanical linkage, such that pivoting the handle from its first handle position to its second handle position results in a pivoting of the flap from its closing position to its opening position.

According to a further embodiment of the trolley, a lower section of the flap is connected by the first bearing to a section of the sidewall extending between the opening and the bottomwall.

According to a further embodiment of the trolley, the handle is configured as a length adjustable handle.

According to a further embodiment of the trolley, wherein the handle comprises a telescopically length adjustable handle section extending between the handle axis and a grip section of the handle.

According to a further embodiment of the trolley, the handle, in particular its grip section, comprises an operating button, wherein the handle is configured, such that the length of the handle, in particular of the handle section, is adjustable, if the operating button is operated, in particular pushed.

According to a further embodiment of the trolley, the handle and/or the housing comprises a locking unit configured to lock the handle in its first handle position and/or in its second handle position.

According to a further embodiment of the trolley, the mechanical linkage comprises a clutch, which may be switched between a coupling state and a decoupling state, wherein the mechanical linkage couples the handle and the flap, if the clutch is in the coupling state, and wherein the mechanical linkage decouples the handle and the flap, if the clutch in the decoupling state, such that the handle is pivotable without resulting in a pivot movement of the flap, and/or vice versa.

According to a further embodiment of the trolley, clutch is configured to automatically switch into the coupling state, if the handle reaches the second handle position, such that mechanical linkage couples the handle and the flap.

According to a further embodiment of the trolley, the mechanical linkage comprises: a handle shaft as a part of the first bearing and defining the handle axis, a first arm element being, preferably releasably, connected to the handle shaft, a lever being pivotable about a lever axis, and a connecting element, wherein an end section of the first arm element is pivotably connected to a first end section of the lever, wherein a second end section of the lever is pivotably connected to a first end section of the connecting element, and wherein a second end section of the connecting element is pivotably connected to the flap, in particular with an upper section of the flap facing away from the first bearing.

According to a further embodiment of the trolley, the mechanical linkage is configured to be in a self-locking state for the flap, if the flap is in the closing position and/or if the handle is in the first handle position.

According to a further embodiment of the trolley, the mechanical linkage is configured to be in an unlocked state for the flap, if the handle is pivoted from the first handle position in direction to the second handle position, in particular if the clutch is in the coupling state.

According to a further embodiment of the trolley, the mechanical linkage is in a stable state for the handle, if the handle is in the first handle position, in particular if the clutch is in the coupling state.

According to a further embodiment of the trolley, the flap has a U-shaped cross profile.

According to a further embodiment of the trolley, the flap comprises a basewall and two standing walls extending, each at least essentially perpendicular from the basewall towards the opening of the housing, wherein the two standing walls are spaced apart from each other.

BRIEF DESCRIPTION OF THE DRAWINGS

Additional features, advantages and possible applications of the present invention may be gleaned from the following description of the exemplary embodiments and the figures. All described and/or graphically described features here constitute the subject-matter of the invention whether taken separately or in any combination, even independently of their composition in the individual claims or back references thereto. Furthermore, the same reference signs in the figures denote the same or similar objects.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
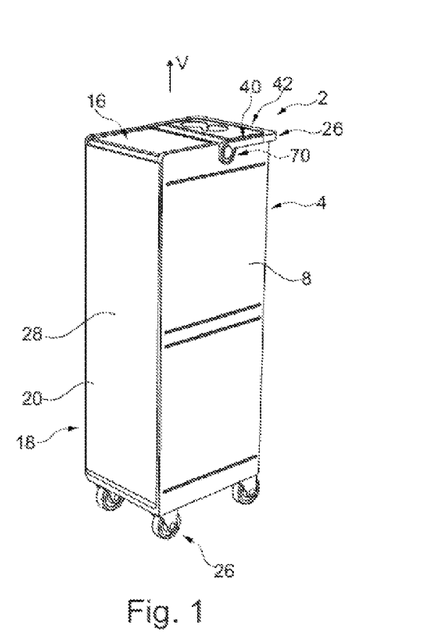
FIG. 1 schematically illustrates a first exemplary embodiment of the trolley in a perspective view.

FIG. 1 schematically illustrates an exemplary embodiment of the trolley 2 in a perspective view. The trolley 2 serves for collecting waste. The trolley comprises a housing 4 with a bottomwall 6 and a sidewall 8 extending from the bottomwall 6 in vertical direction V.

Figure 2:
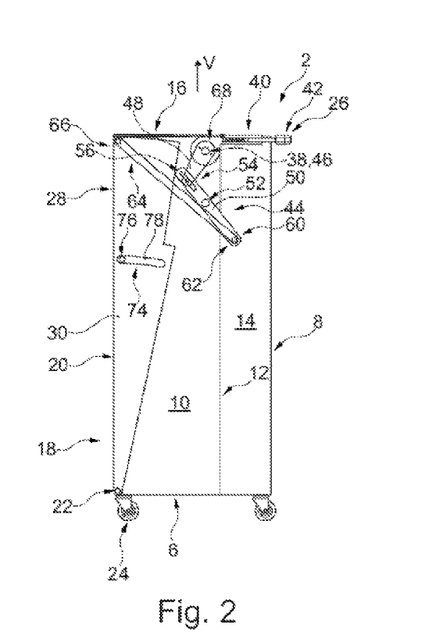
FIG. 2 schematically illustrates the first exemplary embodiment of the trolley in a cross-sectional view.

FIG. 2 schematically illustrates the trolley 2 of FIG. 1 in a cross-sectional view. As can be taken from a combination of FIGS. 1 and 2, the sidewall 8 may have a U-shape cross profile. The sidewall 8 may be formed by a plurality of elements, in particular sidewall-sections. Preferably, the bottomwall 6 and/or the sidewall 8 are made of a light material, in particular aluminum, fiber-reinforced plastics and/or a combination thereof.

Furthermore, the housing 4 forms a waste chamber 10 for receiving waste. The waste chamber 10 may be at least partly formed by the bottomwall 6 and the sidewall 8. Further elements of the housing 4 may also form a part of the waste chamber 10. In particular, the housing 4 may comprise a separating wall 12 which separates the internal space of the housing into the space of the waste chamber 10 and a further space 14. Preferably, the separating wall 12 extends from the bottomwall 6 in vertical direction V. Thus, at least two sections of the sidewall 8, the separating wall 12 and a section of the bottomwall 6 may encompass and/or form the waste chamber 10.

A cover lid 16 may be arranged at the top of the trolley 2. The cover lid 16 may also refer to a cover wall or may be formed by a cap. The cover lid 16 may also form a delimiting section for the waste chamber. At a vertical front surface of the trolley, the sidewall 8 comprises an opening 18. However, the opening 18 may be closed by a flap 20. The flap 20 is connected by a first bearing 22 to the sidewall 8 of the housing 4, such that the flap 20 is pivotable about a horizontal axis, defined and/or provided by the first bearing 22, at least between a closing position and an opening position.

Preferably, a lower section 80 of the flap 20 is connected by the first bearing 22 to a section of the housing 4 and/or the sidewall 8, preferably extending between the opening 18 and the bottom wall 6. As a result, the opening 18 may extend at least essentially from the bottom wall 6 to the top of the trolley 2 and/or of the housing 4. As a further result, the flap 20 may also extend from the bottom wall 6 to the top of the trolley 2 and/or of the housing 4.

In its closing position, the flap 20 closes the opening 18 of the sidewall 8. The opening 18 closed by the flap 20 is schematically shown in FIGS. 1 and 2. Thus, FIGS. 1 and 2 show the flap 20 in its closing position. Accordingly, the trolley 2 may have external dimensions of a standard trolley, and in particular of a full size trolley or a half size trolley.

Further, the trolley 2 comprises wheels 24. The wheels 24 allow the trolley 2 to be moved, in particular through a cabin of an aircraft. For steering the trolley 2, the trolley 2 further comprises a handle 26.

Figure 3:
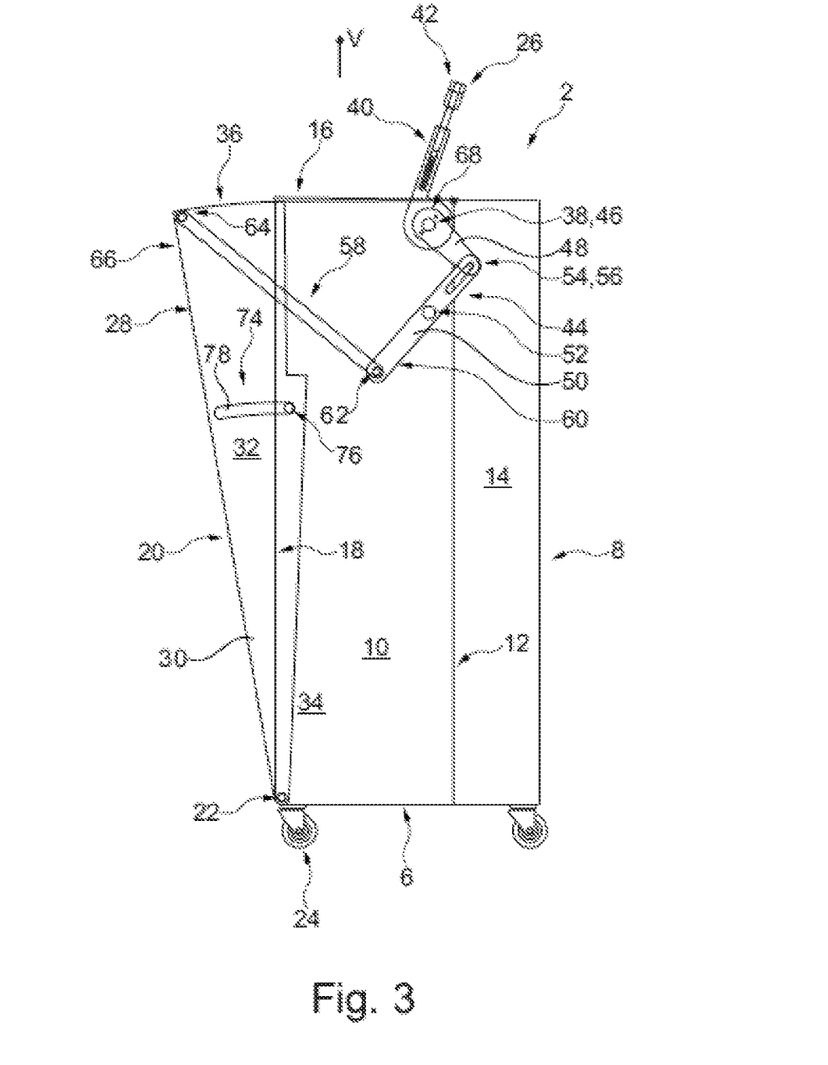
FIG. 3 schematically illustrates a second exemplary embodiment of the trolley in a cross-sectional view.

FIG. 3 schematically illustrates the trolley 2 in a cross-sectional view, wherein the flap 20 is in its opening position. In its opening position, the flap 20 opens the opening 18 of the sidewall 8, such that waste may be inserted into the waste chamber 10. Preferably, the flap 20 has a U-shape cross profile. For this purpose, the flap 20 preferably comprises a basewall 28 and two standing walls 30. Each of the standing walls 30 preferably extends at least essentially perpendicular from the basewall 28 towards the opening 18 of the housing 2, if the flap 20 is in its opening position. The two standing walls 30 are spaced apart from each other, namely preferably with respect to a horizontal direction. The distance between the two standing walls 30 at least essentially corresponds to the horizontal width of the opening 18. The standing walls 30 may engage through the opening 18 to the waste chamber 10, if the flap 20 is in its closing state, as it is schematically and exemplarily shown in FIG. 2. However, if the flap 20 is in its opening state, as it is exemplarily shown in FIG. 3, the standing walls 30 preferably extend from the basewall 28 of the flap 20 to the opening 18, or even with a part of the standing walls 30 into the waste chamber 10. As a result, the flap 20 and the opening 18 preferably form a wedged shape area, which is encompassed by the flap 20 and the opening 18. The wedged shape area may also refer to as the additional waste chamber 32. The waste chamber 10 and the additional waste chamber 32 are connected via the opening 18. Thus, the waste chamber 10 and the additional waste chamber 32 may form an extended waste chamber 34.

At least one of the standing walls 30 may comprise a slot 78, which may be formed by a groove, nut or elongated hole, wherein a pin 76, extending form the housing 4, engages with the slot 78, such that the slot 78 and the engaging pin 76 form a linear guide 74 between the flap 20 and the housing 4. Further, at its end sections, the slot 78 forms stops for the pin 76. Thus, a pivot angle, above which the flap 20 may be pivoted, may be limited by the linear guide 74. In particular, one of the end sections of the slot 78 is configured and/or arranged, such that the linear guide 74 provides a stop for the flap 20 at a predetermined pivot angle, which corresponds to the opening position of the flap 20. Preferably, the other end sections of the slot 78 is configured and/or arranged, such that the linear guide 74 provides a stop for the flap 20 at a further predetermined pivot angle, which corresponds to the closing position of the flap 20. As the flap 20 comprises two standing wall 30, the trolley may comprise a respective linear guide 74 for each of the standing walls 30.

By pivoting the flap 20 from its closing position to its opening position, an upper opening 36 is provided, which provides an entrance for inserting waste into the additional waste chamber 32. As the additional waste chamber 32 is connected via the opening 18 with the waste chamber 10, such that waste may be inserted through the upper opening 36 through the additional waste chamber 32 and the opening 18 into the waste chamber 10. Accordingly, a cabin attendant may move the trolley 2 via steering the trolley 2 by the handle 26 through a cabin of an aircraft, in order to collect waste by inserting this waste into the extended waste chamber 34 (being formed by the waste chamber 10 and the additional waste chamber 32). As a result, the volume for waste within the trolley 2 is extended, too. Since the volume of the waste chamber 10, also referred to as the chamber volume, is connected to the volume of the additional waste chamber 32, such that the extended waste chamber 34 comprises an extended volume, which is larger than the chamber volume. Accordingly, additional waste may be collected, if the flap 20 is in its opening position.

A first function of the handle 26 has previously been described, namely to serve as a handle for steering the trolley. However, the handle may also comprise a further function. For this purpose, the handle 26 is connected by a second bearing 38 to the housing 4, such that the handle 26 is pivotable about a handle axis, formed and/or defined by the second bearing 38, at least between a first handle position and a second handle position. The handle 26 in its first handle position is exemplarily shown in FIGS. 1 and 2. It is preferred that the handle 26 has a horizontal orientation, if it is in its first handle position. Further preferred, the handle 26 does not project above the outer dimensions of the housing 4, if the handle 26 is in its first handle position. However, it may be preferred, that the handle 26 is configured as a length adjustable handle. In particular, a handle section 40 extending from the handle axis 38 to a grip section 42 of the handle 26 is telescopically length adjustable. Thus, the handle section 40 of the handle 26 may be extended in its length, such that the grip section 42 may temporarily project above the outer dimensions of the housing 4. Consequently, a person may grip the grip section 42 of the handle 26 in order to easily steer the trolley 2. If the trolley 2 is to be parked at a desired place, the handle section 40 may be telescopically shortened, such that the grip section 42 does not project above the outer dimensions of the trolley 2. Thus, the trolley 2 may have a compact dimension again.

Furthermore, the handle 26 is linked to the flap 20 by a mechanical linkage 44. The mechanical linkage 44 is configured, such that pivoting the handle 26 from its second handle position to its first handle position results in a pivoting of the flap 20 from its opening position to its closing position. In other words, the handle 26 may be pivoted from the second handle position, as it is shown in FIG. 3, to the first handle position, as it is shown in FIG. 2. Thereby, the handle 26 provides a mechanical moment to a handle shaft 46, wherein the handle shaft 46 is a part of the first bearing 38 and defining the handle axis 38. The handle shaft 46 preferably is a part of the mechanical linkage 44. The mechanical linkage 44 further comprises a first arm element 48. The first arm element 48 is connected to the handle shaft 46 and extending from the handle shaft 46 to first end section 54. Thus, the first arm element 48 may form an excentric arm element. Further preferably, the first arm element 48 may be releasably connected to the handle shaft 46. Further explanations in this regard follow further down this text.

The mechanical linkage 44 further comprises a lever 50. The lever 50 is pivotable about a lever axis 52. Preferably, the lever 50 is pivotable connected to the housing 4 via the lever axis 52. Thus, a respective pivot bearing may be provided pivotably connecting the lever 50 with the housing 4, wherein said pivot bearing defines the lever axis 50. Further, the end section 54 of the first arm element 48, facing away from the handle shaft 46, is pivotably connected to a first end section 56 of the lever 50.

The mechanical linkage 44 further comprises a connecting element 58, which may have, at least basically, the form of a rod. A second end section 60 of the lever 50 is connected to a first end section 62 of the connecting element 58. Thus, a pivot bearing may be provided between the second end section 60 of the lever 50 and the first end section 62 of the connecting element 58. A second end section 64 of the connecting element 58 is pivotably connected to the flap 20, in particular with an upper section 66 of the flap 20 facing away from the first bearing 22. Preferably, a further pivot bearing is provided connecting the second end section 64 of the connecting element 58 and the upper section 66 of the flap 20.

When pivoting the handle 26 from the second handle position towards the first handle position, a mechanical moment is provided to the handle shaft 46 resulting in a swiveling of the first arm element 48 about the handle axis 38, which results in a mechanical moment provided to the lever 50 about the lever axis 52. The mechanical moment applied to the lever 50 results in an axial force applied to the connecting element 58 resulting in a force applied to the flap 20, such that the flap 20 is forced to pivot about the first bearing 22, such that the flap pivots from the opening position to the closing position.

The mechanical linkage 44 is preferably configured, such that pivoting the handle 26 from the second handle position to the first handle position results in a pivoting of the flap 20 from the opening position to the closing position. Accordingly, just a single pivoting movement of the handle 26 is sufficient, in order to pivot the flap from the opening position to the closing position. If waste has been previously collected and inserted into the extended waste chamber 34, pivoting the flap 20 from the opening position to the closing position will result in a compaction of the waste collected in the extended waste chamber 34, such that the same waste is thereafter arranged just and/or only in the waste chamber 10. Consequently, a compaction of the waste occurs. In other words, pivoting the handle 26 from the second handle position to the first handle position would force the flap 20 to pivot from the opening position to the closing position resulting in said compaction of waste.

For pivoting the handle 26 from the second handle position to the first handle position, it may be necessary to apply a respective high force to the handle 26, in particular to its grip section 42. In order to reduce this force to be applied, the handle section 40 of the handle 26 may be extended in its length, before the handle 26 is pivoted from its second handle position to its first handle position. For this purpose, the handle 26 may comprise an operating button (not shown). The operating button may be arranged and/or located at the grip section 42 of the handle 26. The handle 26 is preferably configured, such that the length of the handle section 40 is length adjustable, if the operating button is operated, in particular pushed. Thus, the operating button may be pushed in order to extend, in particular telescopically extend, the handle section 40 of the handle 26, before the handle 26 is pivoted from the second handle position to the first handle position. Thus, a smaller force may be sufficient in order to pivot the handle 26, such that a pivoting of the flap 20 and resulting therefrom a compaction of waste may be performed. After the handle 26 has been pivoted to its first position, the operating button may be operated, in particular pushed, again, in order to reduce the length of the handle section 40 again to the previous length. Thereafter, the trolley 2, having incorporated the compacted waste, may be steered to a desired place, in particular at the galley of the aircraft.

For pivoting the flap 20—in a previous step—from the closing position to the opening position, in order to be able to collect waste, the handle 26 is preferably linked to the flap 20 by the mechanical linkage 44, such that pivoting the handle 26 from its first handle position to its second handle position (also) results in a pivoting of the flap 20 from its closing position to its opening position. As an effect, the extended waste chamber 34 would be provided, wherein waste may be inserted into the extended waste chamber 34 through the upper opening 36. Thus, the handle 26 may be used to—at least indirectly—pivot the flap 20 between its closing position and opening position, or vice versa.

Figure 4:
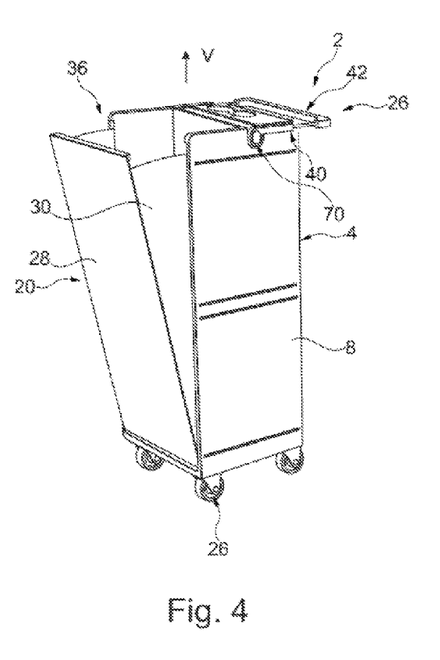
FIG. 4 schematically illustrates a third exemplary embodiment of the trolley in a perspective view.
Figure 5:
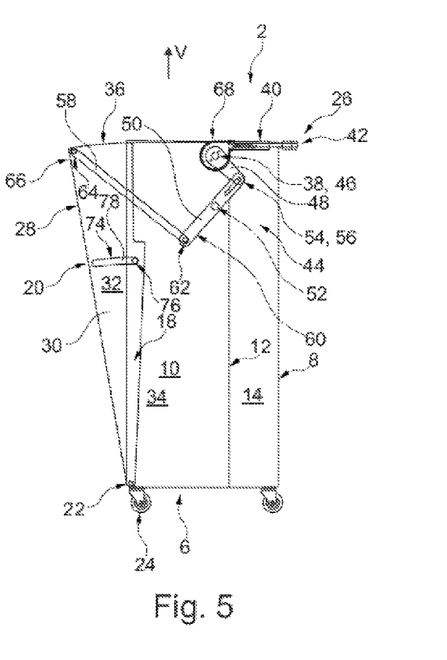
FIG. 5 schematically illustrates the third exemplary embodiment of the trolley in a cross-sectional view.

However, if the handle 26 is pivoted from its first handle position to its second handle position, the handle 26 may be oriented in an oblique angle with the vertical direction V, such that the handle 26 projects upwardly above the top of the trolley 2. This may interfere a person, who is collecting the waste and wishes to insert the collected waste without disturbance into the extended waste chamber 34 through the upper opening 36. In order to reduce the disturbance provided by the handle 26, it is favourable, to pivot the handle 26 back to the first handle position, while the flap 20 remains in its opening position, as it is schematically shown in the perspective illustration of the trolley 2 in FIG. 4 and/or the cross-sectional illustration of the trolley 2 in FIG. 5.

Therefore, the mechanical linkage 44 preferably comprises a clutch 68. The clutch 68 is preferably configured to couple the handle 26 and the flap 30 in a coupling state of the clutch 68. Further, the clutch 68 is preferably configured to decouple the handle 26 and the flap 20 in a decoupling state of the clutch 68. In the coupling state, the handle 26 and the flap 20 are engaged by the mechanical linkage 44, such that a pivoting of the handle 26 results in a pivoting of the flap 20. In the decoupling state of the clutch 68, the mechanical linkage disengages (by means of the clutch 68) the handle 26 and the flap 20, such that the handle 26 is pivotable without resulting a pivot movement of the flap 20, and/or vice versa.

Figure 6:
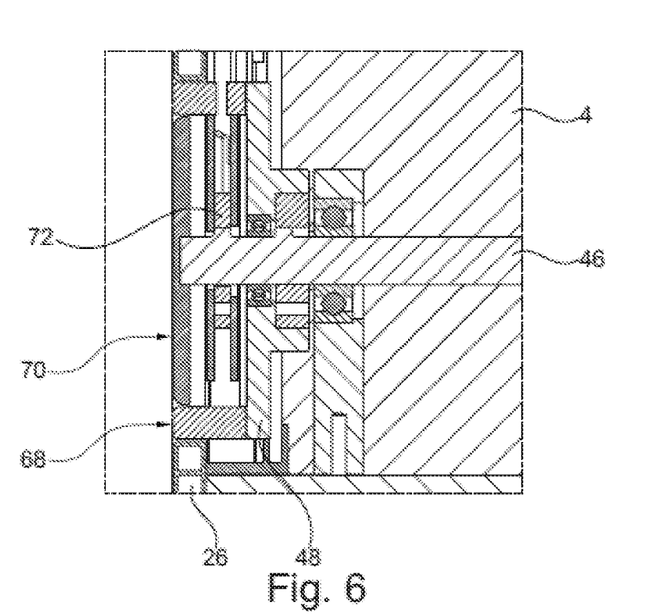
FIG. 6 schematically illustrates a first exemplary embodiment of a part of the mechanical linkage the in a cross-sectional view.
Figure 7:
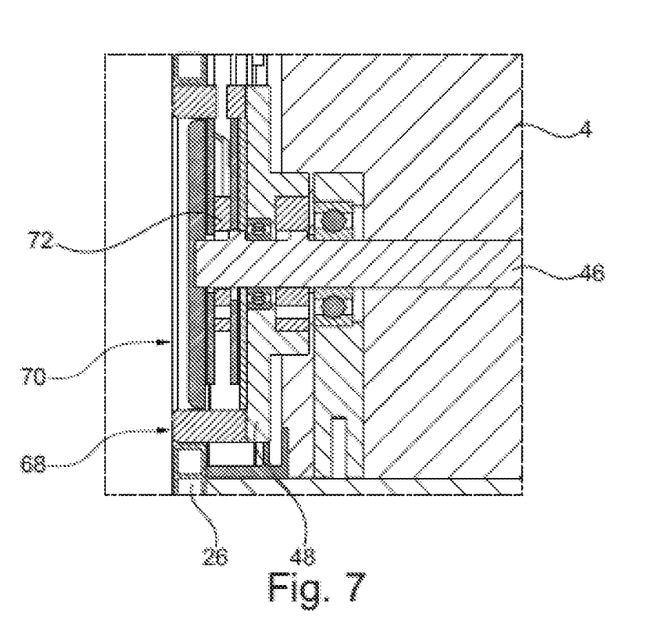
FIG. 7 schematically illustrates a second exemplary embodiment of a part of the mechanical linkage the in a cross-sectional view.

A preferred embodiment of the clutch 68 is schematically illustrated in FIGS. 6 and 7. Said figures show a respective part of the mechanical linkage 44. The mechanical linkage 44 comprises a pivot bearing 82, which is configured to pivotably connect the handle shaft 46 to the housing 4. Furthermore, a cross-section of the first arm element 48 is shown, which is connected to the handle shaft 46. Furthermore, a cross-section of the handle 26 is shown. The clutch 68 releasably connects the handle 26 and the handle shaft 46.

The clutch 68 comprises a clutch operation button 70. The clutch operation button 70 is arranged at a lateral surface of the clutch 68, such that the clutch operation button 70 may be operated, in particular pushed, from outside.

FIG. 6 shows the clutch 68 in a coupling state. For this purpose, a coupling element 72 of the clutch 68 engages, preferably in a form-fit manner, with the handle shaft 46. The clutch operation button 70 is connected to the coupling element 72, such that an operation of the clutch operation button 70 will result in a movement of the coupling element 72, such that the coupling element 72 may disengage from the handle shaft 46, as it is exemplarily shown in FIG. 7. A further operating of the clutch operation button 70 would result in a backward movement of the coupling element 72, such that the coupling element 72 re-engages with the handle shaft 46. Thus, by operating the clutch operation button 70, the clutch 68 may be transferred from the coupling state to the decoupling state, and/or vice versa. As an effect, after pivoting the handle 26 from its first handle position to its second handle position, in order to force the flap 20 to pivot from its closing position to its opening position, the clutch operation button 70 may be operated, in particular pushed, such that the clutch 68 switches from the coupling state to the decoupling state. Thereafter, the handle 26 may be pivoted (freely) from the second handle position again to the first handle position, while the flap 20 remains in its opening position, as it is exemplarily shown in FIGS. 4 and 5.

In order to provide a safe steering of the trolley 2, the handle 26 and/or the housing 4 may comprise a locking unit (not shown) configured to lock the handle 26 in its first handle position. Thus, after pivoting the handle 26 freely from the second handle position to the first handle position, the handle 26 may be locked via the locking unit. Thus, the trolley 2 may thereafter be moved and steered by the handle 26, in particular through a cabin of an aircraft in order to collect waste. The locking unit may comprise a (further) operating button in order to operate the locking unit, in particular to unlock the handle 26. Thus, by operating the (further) operating button of the locking unit, the handle 26 may be freely pivoted from its first handle position back to its second handle position, as it is exemplarily shown in FIG. 3. According to a preferred embodiment, the clutch 68 may be configured to automatically switch to the coupling state, if the handle 26 reaches the second handle position. Thus, if the handle 26 is freely moved to the second handle position, the clutch 68 switches to the coupling state, in order to provide the engagement between the handle 26 and the handle shaft 46. Thereafter, the handle 26 may be pivoted from the second handle position to the first handle position, in order to force the pivoting of the flap 20 from its opening state to its closing state, resulting in a compaction of waste.

Although the mechanical linkage 44 described above has been—in the sense of the preferred embodiment—described as comprising a clutch 68, this clutch 68 may be neglected. Thus, the mechanical linkage 44 may not comprise the above discussed clutch 68. Thus, the handle 26 may be permanently coupled via the mechanical linkage 44 to the flap 20. As an effect, the robustness of the mechanical linkage 44 may be increased.

While certain embodiments of the invention have been illustrated and described in detail in the drawings and foregoing description, such illustration and description are to be considered illustrative or exemplary and not restrictive. The invention is not limited to the disclosed embodiments. Other variations to the disclosed embodiments may be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single element or unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

What is claimed is:

1. A trolley for collecting waste, comprising:
   wheels for moving the trolley;
   a handle for steering the trolley; and
   a housing with a bottomwall and a sidewall extending from the bottomwall in vertical direction V, the housing forming a waste chamber for receiving waste, wherein:
   the sidewall comprises an opening;
   a flap is connected by a first bearing to the sidewall of the housing such that the flap is pivotable about a horizontal flap axis at least between a closing position and an opening position;
   the flap in its closing position closes the opening of the sidewall;
   the flap in its opening position opens the opening in the sidewall, such that waste can be inserted into the waste chamber;
   the handle is connected by a second bearing to the housing, such that the handle is pivotable about a handle axis at least between a first handle position and a second handle position; and
   the handle is linked to the flap by a mechanical linkage, such that pivoting the handle from its second handle position to its first handle position results in a pivoting of the flap from its opening position to its closing position.

2. The trolley according to claim 1, wherein the handle is linked to the flap by the mechanical linkage, such that pivoting the handle from its first handle position to its second handle position results in a pivoting of the flap from its closing position to its opening position.

3. The trolley according to claim 1, wherein a lower section of the flap is connected by the first bearing to a section of the sidewall extending between the opening and the bottomwall.

4. The trolley according to claim 1, wherein the handle is configured as a length adjustable handle.

5. The trolley according to claim 4, wherein the handle comprises a telescopically length adjustable handle section extending between the handle axis and a grip section of the handle.

6. The trolley according to claim 4, wherein the handle comprises an operating button, wherein the handle is configured, such that the length of the handle is adjustable, if the operating button is operated.

7. The trolley according to claim 6, wherein the handle and/or the housing comprises a locking unit configured to lock the handle in its first handle position and/or in its second handle position.

8. The trolley according to claim 1, wherein the mechanical linkage comprises a clutch, which can be switched between a coupling state and a decoupling state, wherein the mechanical linkage couples the handle and the flap, if the clutch is in the coupling state, and wherein the mechanical linkage decouples the handle and the flap, if the clutch in the decoupling state, such that the handle is pivotable without resulting in a pivot movement of the flap, and/or vice versa.

9. The trolley according to claim 8, wherein the mechanical linkage is in a stable state for the handle, if the handle is in the first handle position.

10. The trolley according to claim 1, wherein clutch is configured to automatically switch into the coupling state, if the handle reaches the second handle position, such that mechanical linkage couples the handle and the flap.

11. The trolley according to claim 1, wherein the mechanical linkage comprises: a handle shaft as a part of the first bearing and defining the handle axis, a first arm element connected to the handle shaft, a lever being pivotable about a lever axis, and a connecting element, wherein an end section of the first arm element is pivotably connected to a first end section of the lever, wherein a second end section of the lever is pivotably connected to a first end section of the connecting element, and wherein a second end section of the connecting element is pivotably connected to the flap, with an upper section of the flap facing away from the first bearing.

12. The trolley according to claim 11, wherein the mechanical linkage is configured to be in a self-locking state for the flap, if the flap is in the closing position and/or if the handle is in the first handle position.

13. The trolley according to claim 12, wherein the mechanical linkage is configured to be in an unlocked state for the flap, if the handle is pivoted from the first handle position in direction to the second handle position.

14. The trolley according to claim 1, wherein the flap has a U-shaped cross profile.

15. The trolley according to claim 1, wherein the flap comprises a basewall and two standing walls extending, each at least essentially perpendicular from the basewall towards the opening of the housing, wherein the two standing walls are spaced apart from each other.

* * * * *